March 23, 1965 H. BRANDT 3,174,263
ELECTROSTATIC PRECIPITATOR
Filed March 16, 1961 3 Sheets-Sheet 1

Inventor
Herbert Brandt
by Albert T. Jacks
atty.

March 23, 1965     H. BRANDT     3,174,263
ELECTROSTATIC PRECIPITATOR

Filed March 16, 1961     3 Sheets-Sheet 2

Inventor
Herbert Brandt
by Albert J. Jacks
Atty.

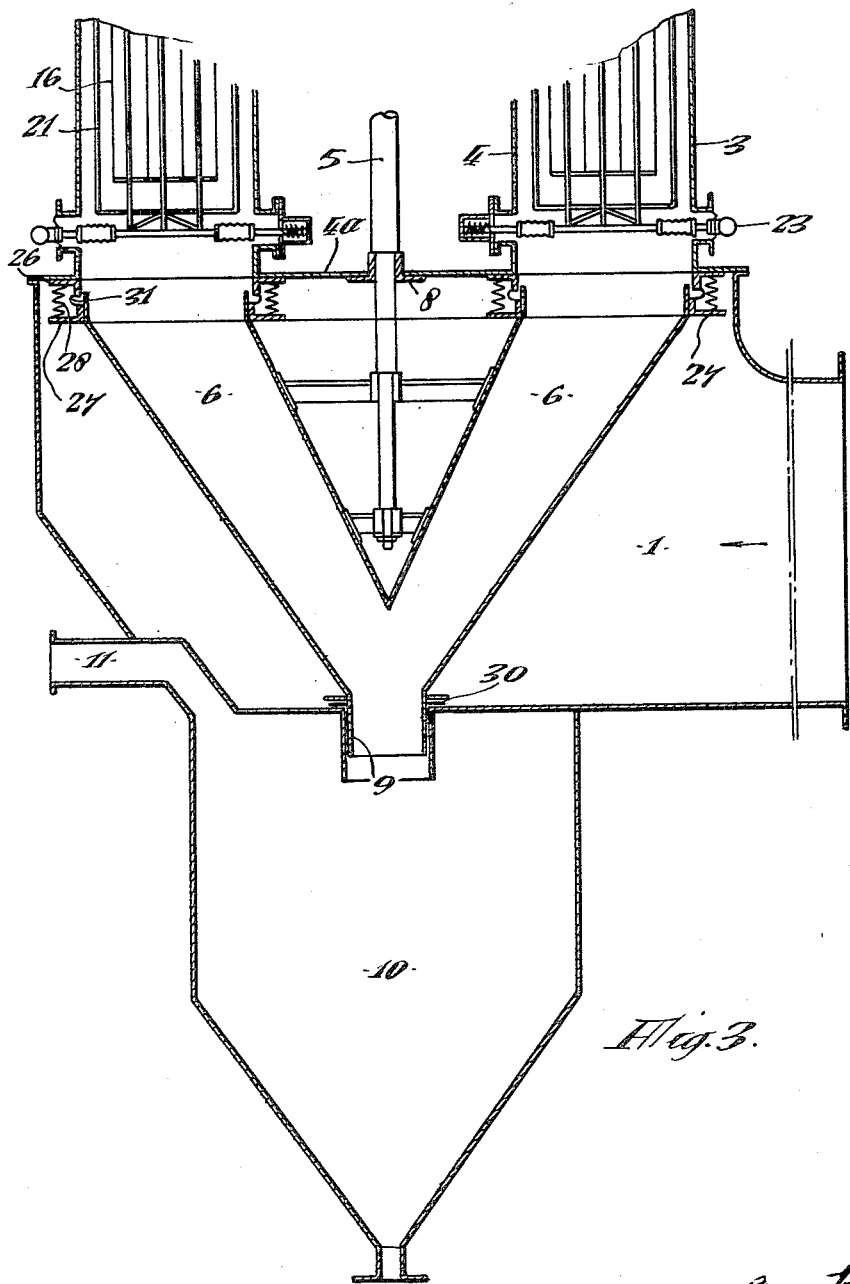

3,174,263
ELECTROSTATIC PRECIPITATOR
Herbert Brandt, Rothemuhle uber Olpe, Westphalia, Germany, assignor to Apparatebau Rothemuhle Dr. Brandt & Co., Westphalia, Germany, a company of Germany
Filed Mar. 16, 1961, Ser. No. 96,136
Claims priority, application Germany, Mar. 16, 1960,
A 34,229
2 Claims. (Cl. 55—112)

This invention relates to electrostatic precipitators for the removal of dust from flue gas, in which the flue gas flows vertically upwards, and, in cross section, the apparatus is divided into several chambers in such a way that each of these chambers can be sealed off from the flue gas flow by means of a rotatable system at the inlet and outlet of the chamber. At the same time the high-tensioned current will be cut off or throttled. In such precipitators the dust adhering to the electrodes is cleared by sealing a chamber from the passage of the flue gas and passing a cleansing gas through the said chamber at a high speed, for example at a speed of 20 to 60 metres per second approximately. The cleansing gas will loosen the adhering dust and carry it away, and thereafter the cleansing gas will be cleaned in mechanical dust collectors and added to flue gas which is not being cleaned, assuming that such gas will not be recirculated through the precipitator.

The efficiency of such plants is not always sufficient, as, despite the high speed of the cleansing gas flow, no sufficient forces will be applied to strongly adhering dust particles to loosen them from the collecting electrodes. The dust can adhere to the electrodes with comparatively strong electrical forces as it cannot in any case discharge the static electricity if the power supply is disconnected only for the short time of the cleaning period. In other cases where the dust is hard and less adhesive, the dust erodes the precipitator at the high velocity of the cleaning gases.

The present invention is based on the experience that due to the vibrations of the electrodes sensible large forces become available for removing dust from the electrodes.

An electrostatic precipitator according to the invention comprising a vertically extending casing with inner and outer walls, radial walls dividing the casing into a plurality of sector-shaped chambers through which dust-laden gas is caused to flow, which chambers each contain a set of negative and positive electrodes, each of said chambers being disconnected separately from the passing gas flow by a revolving system in a predetermined time sequence whereby the electric power supply to said electrodes of said chambers will be switched off or throttled, is characterised in that rapping devices are provided to displace dust from the electrodes during the disconnection of the gas flow and eventually during the power supply being switched off from a said chamber, the disconnecting of the gas flow being effected by an upper rotatable sealing plate at the top of said chamber while on the lower end of the said chamber the gas entrance is cut off by a rotatable dust discharge duct which simultaneously connects the said chamber during its cleaning period, with a lower dust hopper into which the loosened dust particles fall.

The revolving system does not consist of two rotatable duct connections synchronously moving together at the inlet and outlet of the chambers through which the flue gas flows vertically upwards, but consists of only one rotatable duct connection at the lower end of the chambers and a level sealing plate at the upper end which moves synchronously with the duct connection. While sealing one chamber the system of cathodes and anodes therein will be vibrated by mechanical knocks or by means of vibrators. At the same time the supply of high voltage electricity to the chamber will be cut off or throttled. Due to the violent vibration the dust loosens from the electrodes, falls down the inside of the chamber and through the lower rotatable duct connection into a collecting hopper.

The dust discharge is sustained by sucking off a small quantity of gas. The upper rotatable sealing plate may not seal entirely, and a small gas quantity may be sucked into the chamber. During and after the vibrating of the electrodes, the said gas will clean from the chamber the fine dust which would otherwise remain in suspension in the chamber for a long time. This small quantity of gas passes through the chamber at a speed up to a few metres per second. The gas will be separated from the dust and will be recirculated into the dust-laden gas at the dust collector inlet. The suction of this gas out of the collecting hopper will be effected at a place where most of the dust has already been separated from the said small quantity of gas.

Furthermore, the revolving system of the upper sealing plate synchronously moving with the lower rotatable duct connection will not be moved continuously but in steps from one chamber to the other, in order to obtain the longest possible duration of disconnecting each chamber. When applying a constantly rotating motion, as it has been effected hitherto, the chamber has only slowly been removed out of the gas flow, has remained cut off only for a short time, and has then slowly been switched on.

While the gas flow is altering, the electrical conditions in the chamber are varying too. With a continuously rotating revolving system it is not possible to switch off the electrical high voltage while the gas is still passing through, and complicated devices must be included to decrease the voltage until it is entirely switched off while isolating the chamber if this will be necessary in the case of removing strongly adhesive dust particles. Then, while reopening the chamber to the entry of dust-laden gas, the voltage must be increased again.

Due to the stepwise motion employed in a precipitator according to the present invention, an abruptly cutting on or off can be effected, as the flue gas passes through the chamber either at full speed or not at all.

The revolving system may be duplicated, that is, with two rotatable sealing plates and two rotatable duct connections which are situated opposite to each other in order to balance the masses in relation to the rotatable shaft, and to balance the forces, originating from the pressure differences inside and outside of the sealed sectors, on the rotatable sealing plates and on the rotatable duct connections in relation to the shaft. Furthermore, a sealing device may be applied to a flange of the rotatable dust connection which may be pressed on to a sealing flange of the electrode casing by means of springs, the pressed sealing flange being connected to the rotatable duct connection by means of gas-tight diaphragms. With such a connection the sealing is equally tight, independent of the various thermal expansions. The small quantity of gas will consequently be sucked in only through the gap of the rotatable sealing plate. This gas entirely passes the sector which has to be cleaned.

Furthermore, the switching on and off of the current can be effected by means of a contactless control device with transductors. Therefore, the high voltage system of each chamber is connected to the high voltage supply during the cleaning period too. But magnetic amplifiers or transductors decrease or choke the current and the voltage to zero during the cleaning process.

The invention is illustrated in the accompanying drawings, wherein:

FIG. 3 is a part sectional elevation of a further embodiment which also comprises duplicated upper sealing plates and lower duct connections.

Figure 1:
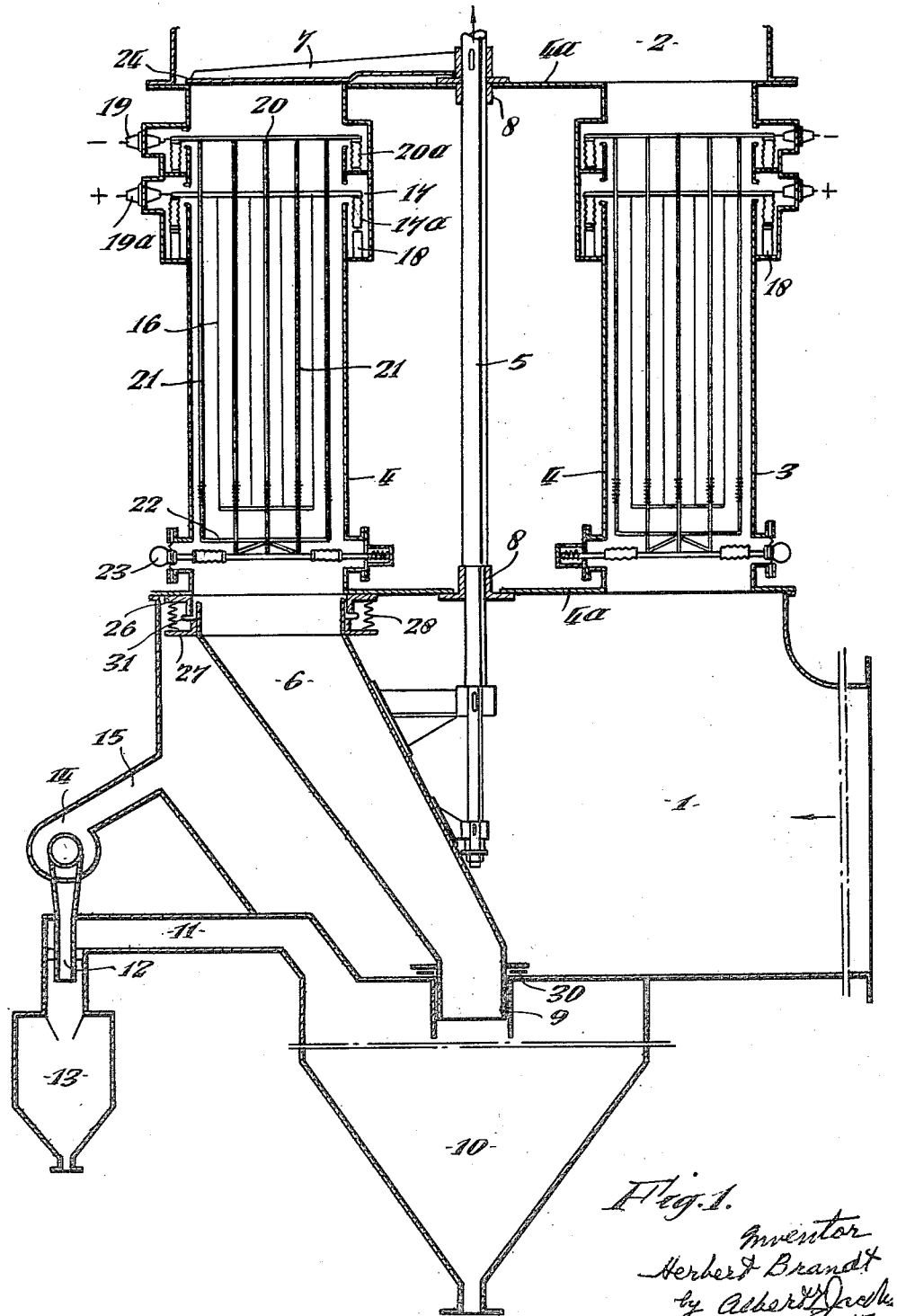
FIG. 1 is a sectional elevation of one embodiment of the invention, in which the revolving system comprises a single upper sealing plate and a single lower duct connection.

In the drawings, 1 is the inlet duct for flue gas into the dust collecting plant, and 2 is the outlet duct for the clean gas. The dust collecting plant itself consists of a casing with an outer wall 3 and an inner wall 4, and with cover plates 4a having connecting flanges at both ends, dividing walls 29 running from one end to the other of the chamber between said walls so as to form sectors 32. Into the two cover plates 4a are built the bearings 8 for a shaft 5 to which are fixed a rotatable dust duct 6 and a rotatable sealing plate 7 so that they rotate with the shaft; the drive to the shaft is not shown, but may be located at any suitable place on the shaft, and is such that the shaft 5 is rotated intermittently, that is, stepwise.

The rotatable dust duct 6 through which the separated dust will fall down into a stationary hopper 10 when a filter sector is cleaned is directed into the said hopper 10 by a centering guide 9 which is directed to the projected axis of the shaft 5; the centering guide 9 is sealed by a sealing device 30.

From the dust hopper 10 a suction pipe 11 leads to a secondary dust collector 12 with a secondary dust hopper 13. Through the suction pipe 11 and the secondary dust collector 12 will be sucked away the small quantity of gas which escapes, from the cleaned flue gas in the sector-shaped chambers 32 of the electrical precipitator, through the gap of the sealing of the rotatable sealing plate 7 against the flanges of the upper cover plate 4a and the ends of sector walls 29. A suction fan 14 leads such escaped gas back into the flue inlet gas duct 1.

Figure 2:
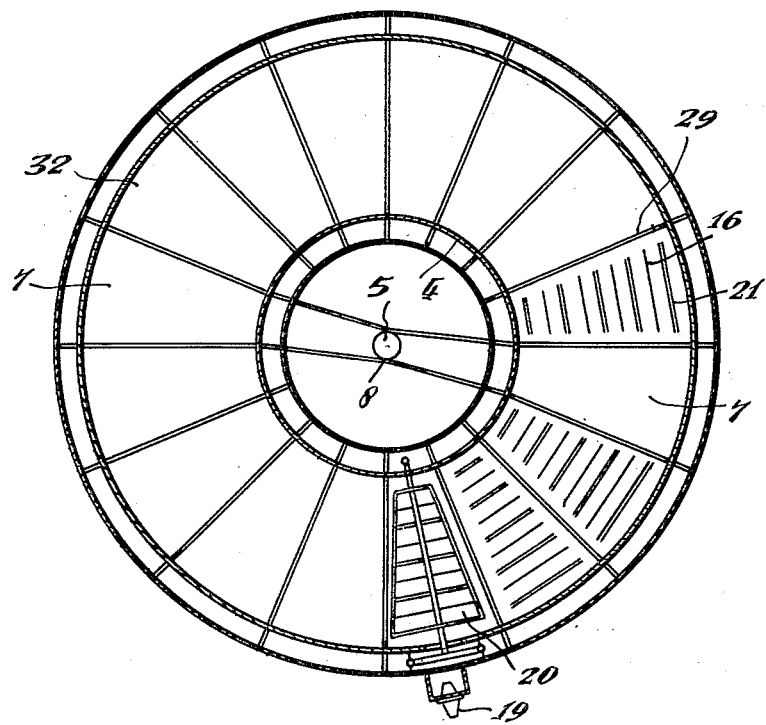
FIG. 2 is a sectional plan view of another embodiment of the invention in which the revolving system comprises two diametrically opposed upper sealing plates and two corresponding diametrically opposed lower duct connections.

FIG. 2 shows, as an example, sixteen sector chambers 32. Each of these sector chambers provides an independent part of the electrical precipitator. If the revolving system is constructed in duplicate two opposed sector-shaped chambers will be cleaned at the same time; in this case, the devices will have a common electricity supply.

The electrical precipitator may be provided with electrodes of different polarity. The anodes 16 may be pipes, tubular ducts of polygonal cross section, or plates of arbitrary form, which provide a path in the direction of the gas flow in which the cathodes 21 are located. The cathodes 21, in this case, serve as combined discharge and separating electrodes, whereas the anodes 16 are connected with the positive pole of the high tension source and therefore they are supported on insulators in the same way as the cathodes.

Other electrode arrangements may, of course, also be used for the electric dust collection; for example, the anodes 16 may be earthed and the cathodes 21 may only be used as electrical discharge means. In the case of an electrode arrangement as shown in the drawings, the anodes 16 are suspended from carrier supports 17 which are supported by supporting insulators 17a, under which rapping devices 18 are installed. By means of these rapping devices a shock is applied intermittently to the anodes while the electricity supply to the sector-shaped chambers 32 is switched off or throttled.

By applying such intermittent shocks, which may be effected, for example, by alternate lifting and dropping of the anode system, the dust will be knocked off the collecting areas and will fall down through the rotatable dust discharge duct 6 into the dust hopper 10. The finest dust which remains in suspension in the gas will be entrained by the small quantity of gas being removed by suction, escaping through the gap of the sealing at the rotatable sealing plates 7 and being sucked off by the suction fan 14. The cathodes 21 are fixed on a supporting system 20 which is supported by insulators 20a so as to be isolated from the earthed casing of the dust collecting plant. High-tension direct current will be introduced to the electrode system through entrance insulators 19 and 19a.

At the lower ends the cathodes 21 are connected to one another by a distance member 22 which may be supported by springs and insulators from the walls 3, 4 or 29 and may be vibrated by hammers or vibrators 23 for the cleaning of the cathode system.

Since it is desirable that the small gas quantity to be sucked off enters only into the sector chambers 32 which are just ready to be cleaned, through the gaps in the sealing of the rotatable sealing plates 7, it is necessary to seal the rotating dust discharge duct 6 tightly against the flanges of the lower cover plate 4a. FIGS. 1 and 3 show a suitable sealing means, comprising a sealing frame 26 which is connected gas-tightly by a membrane 31 to a flange 27 on the rotating dust discharge duct 6. Springs 28 are located between the frame 26 and the flange 27 to press the sealing frame 26 against the bottom flange 4a and the bottom ends of the walls 29 whilst sliding thereover during rotation of the duct 6.

FIG. 2 shows a horizontal section of an electrostatic precipitator in which the rotatable sealing plate 7 of the revolving system is duplicated on opposite sides of the shaft 5. There are also two rotatable dust discharge ducts.

FIG. 3 shows the lower part of a vertical cross section of a dust collecting plant, otherwise similar to FIG. 1, in which the rotatable dust discharge duct 6 is duplicated, with the rotatable sealing plate also duplicated as shown in FIG. 2. Furthermore the sealing between the rotatable dust discharge duct 6 and the casing of the precipitator at the lower cover plate 4a and bottom ends of the sector dividing walls 29 is provided by the sealing frames 26, the flanges 27, the membranes 31, and the springs 28.

FIG. 2 shows the high voltage supply means to one sector-shaped chamber, there being sixteen sector-shaped chambers with revolving sealing plates and connection ducts in duplicate. In the case of removing strongly adhesive dust particles of each eight adjacent chambers the high voltage supply means to seven chambers can remain under voltage while from the eighth chamber the electricity is switched off, as known, or throttled down to zero by a magnetic amplifier. With the rotation of the revolving system by the shaft 5 the current supply of the chambers will be switched off or throttled simultaneously so that the chambers which are to be cleaned are always without current and voltage.

What I claim and desire to secure by Letters Patent is:

1. An electrostatic precipitator comprising a gas supply channel for flow of gas to be cleaned, a gas discharge channel for flow of cleaned gas, a cylindrical casing between said gas supply and gas discharge channels through which casing the gas to be cleaned passes in axial direction, an inner and outer cylindrical shell forming an annular space within said casing, a plurality of radially extending partitions, dividing said annular space into a series of sector-like compartments, arranged symmetrically about a common axis, a set of anodes and cathodes mounted in each of said compartments in fixed spaced relation to one another and extending lengthwise in axial direction through said compartments, said set being adapted to be selectively connected and disconnected to a current supply source, relatively rotatable means including structure rotatable about said axis for completely isolating predetermined ones of said compartments from said gas supply and gas discharge channels intermittently while permitting gas flow through the remaining compartments, two mechanical cleaning devices, one for the anodes and another for the cathode in each compartment, the said mechanical cleaning devices in a said isolated compartment being operated simultaneously to remove the deposited dust particles from the surfaces of said anodes and cathodes by imparting a physical movement thereto, a dust hopper located below said casing, means below the casing providing a rotatable dust discharge duct rotatable synchronously with said rotatable isolating means to communicate with said isolated compartment for conducting precipitated material dislodged by said cleaning devices to said dust hopper, a secondary dust separating device, a fan, and means operatively connecting the said fan to said secondary dust separating device to cause gas to flow therethrough, the said secondary dust separating device having gas inlet means and gas outlet means, means connecting the said gas inlet means to the dust hopper, and means connecting the said gas outlet means to the said gas supply channel, whereby the small quantity of gas drawn by the fan from the gas discharge channel through the said isolated compartments and rotatable dust discharge duct entrains remaining dust and carries said dust to said secondary dust separating device for removal, whereafter the dust free gas is reintroduced into the said gas supply channel.

2. An electrostatic precipitator according to claim 1, further comprising a sealing frame disposed between the lower end surface of said casing and the upper portion of said rotatable dust discharge duct and connected to said lower end surface, a flexible expansion joint connecting said upper portion of said duct to said lower end surface and spring means connected to said lower end surface and said upper portion of said duct for pressing said sealing frame tightly against said lower end surface of said casing.

References Cited by the Examiner

UNITED STATES PATENTS

| | | | |
|---|---|---|---|
| 2,490,979 | 12/49 | Palmer | 55—110 |
| 2,726,730 | 12/55 | MacKenzie | 55—110 |
| 2,887,175 | 5/59 | Klemperer | 55—111 |
| 2,887,176 | 5/59 | Hodson | 55—111 |
| 2,911,060 | 11/59 | Rawe | 55—117 |
| 3,010,704 | 11/61 | Egbert | 165—9 |
| 3,049,848 | 8/62 | Klemperer | 55—111 X |

FOREIGN PATENTS

| | | |
|---|---|---|
| 842,948 | 7/52 | Germany. |
| 634,627 | 3/50 | Great Britain. |

HARRY B. THORNTON, *Primary Examiner.*

GEORGE D. MITCHELL, HERBERT L. MARTIN, ROBERT F. BURNETT, WALTER BERLOWITZ,
*Examiners.*